United States Patent Office 3,011,999
Patented Dec. 5, 1961

3,011,999
VINYL RESIN COMPOSITION CONTAINING 1,3-BUTYLENE ISOPHTHALATE AS A PLASTICIZER
John A. Parker, Lancaster Township, Lancaster County, and John Versnel, Manor Township, Lancaster County, Pa., assignors to Armstrong Cork Company, Lancaster, Pa., a corporation of Pennsylvania
No Drawing. Filed Oct. 30, 1958, Ser. No. 770,614
5 Claims. (Cl. 260—45.5)

This invention relates generally to a composition containing a polymerized vinyl chloride resin, and more particularly to a composition comprising a polymerized vinyl chloride resin and a certain high temperature plasticizer and extender therefor.

Hard surface floor coverings are more widely used today than ever before. In particular plastic floor coverings containing a thermoplastic resin as a binder instead of linoleum cement are finding more and more applications throughout the country. Wider use of plastic floor covering has made it necessary to produce the floor covering in a great variety of colors and patterns, many of which are of pastel shade or of other light color; even white floorings, or floorings containing a great deal of white, are in use.

Use of these light-colored plastic floorings has produced an unexpected problem throughout the industry. Those parts of light-colored plastic floorings subjected to heavy traffic have developed undue brownish or yellowish stains. This phenomenon, known as traffic staining, now constitutes one of the major problems in the use of light-colored plastic floorings in heavy traffic areas. The industry has devoted much research time and effort in an effort to solve it, but no good solution has been forthcoming. It has been learned that the traffic staining problem appears to be related to the plasticizer used with the polymerized vinyl chloride resin binder in the flooring, but all efforts to find a suitable plasticizer which will eliminate or minimize traffic staining has so far been unavailing.

It is the primary object of the present invention to supply a plasticized polymerized vinyl chloride resin composition suitable for use in a plastic flooring binder which will reduce or eliminate the traffic staining phenomenon. A further object is to present a plastic floor covering binder having increased strength when used in a floor covering while at the same time minimizing traffic staining.

These objects are achieved in a straightforward and unexpected manner. The invention contemplates a plastic floor covering binder comprising a polymerized vinyl chloride resin selected from the group consisting of polyvinyl chloride, vinyl chloride-vinyl acetate copolymers, and mixtures thereof. As a high temperature plasticizer and extender for the polymerized vinyl chloride resin, the invention contemplates about 5–40 parts by weight of the polyester 1,3-butylene isophthalate having a molecular weight in the range of 1400–4000 per 100 parts by weight of the polymerized vinyl chloride resin.

The polymerized vinyl chloride resins to be used in the composition of the present invention may be those low to medium molecular weight resins available in commerce. Exemplary of such resins are the vinyl chloride-vinyl acetate copolymers containing about 3%–5% vinyl acetate made by the Bakelite Company and bearing the designation "VYMF," and "VYVF." The copolymers containing about 13% vinyl acetate such as those designated "VYNW," and "VYHH," are suitable. Straight polyvinyl chloride resins such as those designated Geon resins, particularly "Geon 121" and "Geon 126," are suitable. Mixtures of the straight polymer and the copolymers will frequently be used. The most significant property of the polymerized vinyl chloride resins suitable for use in the composition of the present invention is that of yielding a hard, tough and otherwise suitable surface covering material after being plasticized and admixed with suitable fillers and other ingredients and formed into a surface covering material.

Generally speaking the present composition to be used as a binder comprises about 50% to about 25% by weight of the wearing surface composition of the floor covering. The binder is admixed with filler, including pigment, in such proportions that the filler comprises about 50% to about 75% by weight of the composition. When the filler content is below about 50%, pattern control may be difficult. When more than about 75% by weight of filler is present, the physical properties of the finished surface covering materials do not measure up to the desired standards in the floor covering art. The filler material may be organic or inorganic, or mixtures thereof. The filler often includes a preponderant proportion by volume of fibrous filler, such as wood flour, cork particles, asbestos, other mineral fibers, and the like. The remainder of the filler component is comprised of finely-divided particles such as whiting, clay, silica, slate flour, and similar non-fibrous filler material. If the flooring is destined to be installed below grade, then it is preferred that the filler system consist of inorganic fillers, fibrous or non-fibrous or both. Such a filler system is insensitive to the alkaline moisture conditions encountered on below grade or on grade installations. Also included in the filler component are small but effective amounts of lubricants and detachifying agents, such as for example stearic acid, paraffin wax, ceresin wax, oleic acid, lauric acid, and dibutyl ammonium oleate. Synthetic rubber such as the butadiene-styrene copolymers, or the butadiene-acrylonitrile copolymers may be added. The addition of these rubbers renders the composition sulfur-curable whereupon vulcanizing agents and curing accelerators may then be added to the filled composition. Thus there may be added sulfur, or sulfur containing compounds, along with various vulcanization accelerators as for example zinc phenyl ethyl dithiocarbamate, diethyl dithiocarbamate, zinc isopropyl dithiocarbamate, zinc diethyl dithiocarbamate, zinc phenyl ethyl dithiocarbamate, diphenyl guanadine, tetraethyl thiuram disulfide, and tetramethyl thiuram disulfide. Stabilizers or anti-oxidants such as hydroquinone, N-phenyl alpha naphthylamine, N-phenyl beta naphthylamine, N,N'-exomethylene-bis-orthohydroxy benzamid, sodium acid phosphate, dibutyl tin laurate, and others known in the art may be used. The total amount of the compounding agents exclusive of the fibrous and non-fibrous filler generally runs up to about 10% by weight of the filler. The plasticizers normally incorporated into the composition are dioctyl phthalates, dicapryl phthalate, dibutyl sebacate, dibutoxy ethyl phthalate, tricrysyl phosphate, dibutyl phthalate, m-alkyl toluene sulfonamid, and other known plasticizers. Epoxidized plasticizers may be used such as the epoxidized soybean oil fatty acids. Various polymeric plasticizers have also been used.

In producing the composition to be calendered into sheet form for use as a floor covering, the ingredients are weighed and mixed in an intensive mixer, such as a Banbury. The resulting mixture is then subjected to further mixing on a mill followed by cooling of the mix. Use of the polymeric 1,3-butylene isophthalate allows easy processing at the elevated mixing temperatures. The slabs from the mill may then be subdivided to the desired particle sizes, and the resulting mixture of finely-divided particles may be passed through a calender in an operation to be described more fully below.

In the preferred embodiment of the plastic surface covering preparation, the loose mass of particles which is subjected to the operations of the calender is such that the preponderant proportion is in the range of about eight mesh to dust. Depending on the pattern desired, chips and strips may be used. The completed formulation may be calendered into a sheet which may be applied to a backing at the same or a subsequent stage of the process. The backing material may be any of a number of materials employed in the production of resilient surface covering material. For example, the backing may be burlap or a saturated felt such as an asphalt saturated felt, a resin saturated felt, or a felt which has been made by a beater saturation process wherein a synthetic rubber is deposited onto the fibers. Thus the fabric backing will include such materials as woven fabric, for example burlap, canvas, cotton sheeting, and felted products such as saturated felt.

Instead of a calendering step, the wearing surface may be consolidated by molding presses which subject the composition to sufficient heat and pressure to consolidate it and affix it to a backing, if any. A backing is not essential, and the composition of the present invention may be utilized as a binder system in the manufacture of vinyl tiles, particularly the so-called vinyl-asbestos tiles, in accordance with known procedures.

As mentioned earlier the nonstaining polyester plasticizer used in the composition of the present invention is polymeric 1,3-butylene isophthalate. The polymer is prepared by the usual polyester forming processes wherein the 1,3-butanediol is reacted with isophthalic acid. Isophthalic acid may also be designated by the name 1,3-benzene dicarboxylic acid. In carrying out the reaction the glycol is preferably used in excess of the acid, often 15%–20% more excess of the 1,3-butanediol. The glycol boils at about 210° C., hence some of it is lost with the other gaseous products during the esterification reaction. The 1,3-butanediol and the isophthalic acid are placed in a suitable reactor and heated to reflux at atmospheric pressure with agitation. An esterification catalyst, either alkaline or acid, may be added to hasten the reaction. After a suitable period of time, for example 24 hours, the water-containing distillate may be removed from the reaction medium. To hasten this water removal an inert gas such as carbon dioxide, nitrogen, or the like may be passed through the reaction mass. Reaction is continued until the polyester has a molecular weight in the range of about 1400–4000, with 3000 as the preferred figure. If the average number molecular weight is below about 1400, the polyester does not impart the advantages in regard to traffic staining and strength to the polymerized vinyl chloride resin. If the number average molecular weight is higher than about 4000, the melt viscosity becomes excessively high and the polymer is difficult to process. In any case, number average molecular weights higher than 4000 are not at all readily obtainable since the high temperatures needed to achieve such molecular weights tend to dehydrate the glycol and thus produce a polyester quite different from the desired 1,3-butylene isophthalate. The usual range of esterification temperatures will be from about 200° C. to about 220° C.

The amount of the polymeric 1,3-butylene isophthalate to be utilized in the composition of the present invention is in the range of about 5–40 parts by weight, and more preferably 20–30 parts for flooring compositions, polymeric plasticizer per 100 parts by weight of the polymerized vinyl chloride resin. Amounts smaller than the stated minimum exert no significant effect, while amounts larger than the stated maximum stiffen the final composition and render it generally unprocessable for the purpose intended.

The advantages resulting from the use of the polymeric 1,3-butylene isophthalate in the polymerized vinyl chloride resins of the present invention are completely unexpected. For example, polymeric 1,3-butylene phthalate in the same molecular weight range is not even compatible with polyvinyl chloride. The same is true with polymeric ethylene isophthalate and polymeric diethylene glycol isophthalate. On the other hand 1,4-butylene isophthalate cannot be prepared in conventional straight ester cook synthesis due to the quantitative decomposition of 1,4-butanediol to tetrahydrofuran. Even when the polymeric 1,4-butylene isophthalate is prepared by transesterification of methyl isophthalate or by the isophthaloyl chloride methods, the resulting composition with polymerized vinyl chloride resins is too brittle for ready use in flooring compositions. Hence the present invention is a narrow one resulting from the completely unexpected discovery that only polymeric 1,3-butylene isophthalate is suitable for the purpose intended.

The following examples illustrate the invention. All parts are by weight unless otherwise stated.

*Example 1*

Into a suitable reactor is placed 1610.2 parts 1,3-butanediol and 2475.8 parts isophthalic acid. The mixture was heated under a blanket of carbon dioxide to a temperature of 200° C., whereupon reflux commenced. After a period of 1000 minutes, the temperature was increased to 220° C. and the distillation products were removed under an increased flow of carbon dioxide bubbling through the reaction mass.

At the end of 1600 minutes, determinations of the hydroxyl number and acid number of the polyester showed that the molecular weight was about 3000, whereupon heating was discontinued and the reaction mass was cooled. The final product was a clear, amber-colored, horny, resinous mass.

In similar manner was prepared diethylene glycol isophthalate, ethylene isophthalate, and an attempt was made to prepare 1,4-butylene isophthalate. The 1,4-butylene isophthalate could not be prepared due to the substantially quantitative conversion of 1,4-butanediol to tetrahydrofuran. The polymeric ethylene isophthalate and diethylene glycol isophthalate were in the form of hard, clear, resinous masses.

*Example 2*

Films were prepared by milling together on a hot mill 100 parts polyvinyl chloride and 35 parts of the various polyesters prepared as described in Example 1. A clear, tough film resulted only when polymeric 1,3-butylene isophthalate was used. The other polyesters gave cloudy, easily breakable films, thus showing incompatibility with polyvinyl chloride.

*Example 3*

Two flooring compositions were prepared, one a control, and the other a test formulation. The compositions contained the following ingredients:

| Ingredients | Control, Parts | Test, Parts |
| --- | --- | --- |
| Vinyl chloride-vinyl acetate copolymer, 13% vinyl acetate (VYNW) | 444 | 388 |
| Vinyl chloride-vinyl acetate copolymer, 13% vinyl acetate, low molecular weight, (VYHH) | 173 | 156 |
| Tricresyl phosphate | 123 | 141 |
| Epoxidized soy bean oil fatty acid plasticizer | 25 | |
| Polymeric 1,3-butylene isophthalate | | 77 |
| Mixture of barium laurate and calcium laurate stabilizer | 17 | 37 |
| Limestone, 50 mesh | 1,088 | 1,085 |
| Titanium dioxide, #12 | 30 | 30 |

After the usual mixing and sheet-forming operations, test installations were made wherein white floor coverings in the form of sheets having the above formula were installed in heavy traffic areas. After four weeks' installation time the control flooring was appreciably darker and carried a heavier yellow permanent traffic stain than did the test installation.

We claim:
1. A composition of matter comprising a polymerized vinyl chloride resin selected from the group consisting of polyvinyl chloride, vinyl chloride-vinyl acetate copolymer, and mixtures thereof, and 5–40 parts by weight polymeric 1,3-butylene isophathalate per 100 parts by weight of said polymerized vinyl chloride resin, said polymeric 1,3-butylene isophathalate having a molecular weight in the range of 1400–4000.

2. A composition according to claim 1 wherein said polymerized vinyl chloride resin comprises polyvinyl chloride.

3. A composition according to claim 1 wherein said polymerized vinyl chloride resin comprises a vinyl chloride-vinyl acetate copolymer.

4. A composition according to claim 1 wherein said polymeric 1,3-butylene isophthalate has a molecular weight of about 3000.

5. A composition according to claim 1 wherein said polymeric 1,3-butylene isophthalate is used in an amount of about 10–20 parts by weight per 100 parts by weight of said polymerized vinyl chloride resin.

References Cited in the file of this patent
UNITED STATES PATENTS

| | | |
|---|---|---|
| 2,617,779 | Griffith et al. | Nov. 11, 1952 |
| 2,708,215 | Kaganoff | May 10, 1955 |

FOREIGN PATENTS

| | | |
|---|---|---|
| 778,872 | Great Britain | July 10, 1957 |

UNITED STATES PATENT OFFICE

CERTIFICATION OF CORRECTION

Patent No. 3,011,999            December 5, 1961

John A. Parker et al.

It is hereby certified that error appears in the above numbered patent requiring correction and that the said Letters Patent should read as corrected below.

Column 1, line 43, for "slitable" read -- suitable --; column 2, line 30, for "detachifying" read -- detackifying --; line 54, for "tricrysyl" read -- tricresyl --; column 4, line 34, before "could" insert -- polyester --.

Signed and sealed this 17th day of April 1962.

(SEAL)
Attest:

ESTON G. JOHNSON
Attesting Officer

DAVID L. LADD
Commissioner of Patents